(12) United States Patent
Noguchi (10) Patent No.: US 6,490,097 B2
(45) Date of Patent: Dec. 3, 2002

(54) LENS BARREL

(75) Inventor: Yukio Noguchi, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/818,495

(22) Filed: Mar. 28, 2001

(65) Prior Publication Data

US 2001/0028512 A1 Oct. 11, 2001

(30) Foreign Application Priority Data

Mar. 31, 2000 (JP) ........................................ 2000-098973

(51) Int. Cl.[7] .......................... G02B 15/14; G02B 17/00
(52) U.S. Cl. ........................................ 359/694; 396/448
(58) Field of Search ............................... 359/694, 822; 396/84, 448, 379

(56) References Cited

U.S. PATENT DOCUMENTS

| 4,990,945 | A | * | 2/1991 | Cho et al. ............... 396/84 |
| 5,144,493 | A | * | 9/1992 | Nomura .................. 359/693 |
| 5,574,526 | A | * | 11/1996 | Kato ..................... 396/133 |
| 5,801,888 | A | * | 9/1998 | Machida et al. .......... 359/694 |
| 5,982,566 | A | * | 11/1999 | Nishimura et al. ........ 359/822 |

FOREIGN PATENT DOCUMENTS

| JP | 5-11310 | 1/1993 |
| JP | 2593203 | 12/1996 |

* cited by examiner

*Primary Examiner*—Georgia Epps
*Assistant Examiner*—Omar Hindi
(74) *Attorney, Agent, or Firm*—Leydig, Voit & Mayer, Ltd.

(57) ABSTRACT

A lens barrel includes first and second cylinders, a base, a single motor, a feed screw, a rotation mechanism, a helicoid mechanism, and a drive gear for transmitting a drive force of the motor to the feed screw and the rotation mechanism. The drive gear includes a cylindrical gear and a shaft gear having a shaft inserted in the cylindrical gear. The cylindrical gear and the shaft gear rotate about a common rotation axis. The cylindrical gear is interposed between the rotation mechanism and the motor, and the shaft gear is interposed between the feed screw and the motor. Accordingly, zooming and focusing can be driven by one motor, increasing integration and providing excellent space efficiency.

4 Claims, 5 Drawing Sheets

Fig.1

Fig.2A
BARREL-SUNK POSITION (X—X)

Fig.2B
BARREL-SUNK POSITION (X—X)

Fig.4A
TELEPHOTO-SIDE STOP POSITION (X–X)

Fig.4B
TELEPHOTO-SIDE STOP POSITION (X–X)

Fig.5A
TELEPHOTO-SIDE FOCUSING STATE (X—X)

Fig.5B
TELEPHOTO-SIDE FOCUSING STATE (X—X)

LENS BARREL

BACKGROUND OF THE INVENTION

1. Field of the Invention

The present invention relates to a lens barrel used in an optical system.

2. Related Background Art

In a small-sized camera having a multi-focal-point lens (zoom lens), the barrel is expanded and contracted to change the distance between an in-barrel lens (lens group) and a focal surface and hence the magnification (hereinafter, also referred to as zooming). At this time, the lenses in the barrel are divided at least into two groups to change the distance between the lens groups to a distance suited for each zoom ratio. Also, the movement of image focusing (hereinafter, also referred to as focusing) is required for any magnification. Focusing is conducted by changing the position of in-barrel lens relative to a focusing plane. Conventionally, as an expansion-and-contraction mechanism for such a lens barrel, it has been a general technique to make the lens barrel in a circular section and employ a helicoid mechanism.

In recent years, down-sizing and high-power zoom-ratio have been advanced for optical apparatuses thus demanding in high-density and high-integration of the parts. Furthermore, there is another demand for cost reduction by reduction in the number of parts or modification to parts easy to manufacture (easy for resin forming, etc.). In particular, this tendency is conspicuous for the small-sized cameras. Under the situation, there is a demand for further improving the expansion and contraction mechanism for a lens barrel stated above. Therefore, it is an object of the present invention to provide a lens barrel having an expansion and contracting mechanism high in space efficiency and excellent in productivity.

SUMMARY OF THE INVENTION

According to a first aspect of the present invention, a lens barrel comprises: a first cylinder sliding in an optical axis direction of an optical system, a second cylinder sliding in the optical axis direction while rotating about the optical axis as a rotation axis, a base for accommodating the first cylinder and the second cylinder therein, a single motor as a drive source for sliding both of the first cylinder and the second cylinder, a feed screw being provided in the base to slide the second cylinder due to a drive force of the motor, a rotation mechanism being provided in the base to rotate the second cylinder due to the drive force of the motor, a helicoid mechanism formed in an outer peripheral surface of the first cylinder and an inner surface of the second cylinder, and a drive gear to transmit a drive force of the motor to the feed screw and the rotation mechanism. The drive gear comprises a cylindrical gear and a shaft gear having a shaft inserted in the cylindrical gear. The cylindrical gear and the shaft gear rotate about a common rotation axis. The second cylinder is allowed to protrude from an interior of the base toward a subject, and the first cylinder is allowed to protrude from an interior of the second cylinder toward the subject due to the helicoid mechanism and rotation of the second cylinder. The cylindrical gear is interposed between the rotation mechanism and the motor, and the shaft gear is interposed between the feed screw and the motor.

Preferably, a pair of first and second gears are included. They rotate about a common rotation axis. The first gear is interposed between the shaft gear and the motor, and the second gear is interposed between the cylindrical gear and the motor. Any one of the first gear and the second gear has an elongate hole formed in a circumferential direction and the other has a protrusion protruding into the elongate hole.

More preferably, a first lens group, a second lens group and a cam mechanism are included. The second lens group is movable relative to the first lens group in the first cylinder. The cam mechanism comprises cam pins and cam grooves. The cam pins protrude from a lens holder toward an interior of the second cylinder. The lens holder holds the second lens group. The cam grooves are formed in the inner surface of the second cylinder. The second lens group is moved relative to the first lens group by the cam mechanism and protruding movement of the first cylinder from the second cylinder.

According to a second aspect of the present invention, a lens barrel comprises: a first cylinder sliding in an optical axis direction of an optical system, a second cylinder sliding in the optical axis direction while rotating about the optical axis as a rotation axis, a base for accommodating the first cylinder and the second cylinder therein, a single motor as a drive source for sliding both of the first cylinder and the second cylinder, a feed screw being provided in the base to slide the second cylinder due to a drive force of the motor, a rotation mechanism being provided in the base to rotate the second cylinder due to the drive force of the motor, a cam mechanism comprising pins protruding from the first cylinder and cam grooves formed in the inner surface of said second cylinder, and a drive gear to transmit a drive force of the motor to the feed screw and the rotation mechanism. The drive gear comprises a cylindrical gear and a shaft gear having a shaft inserted in the cylindrical gear, and the cylindrical gear and the shaft gear rotate about a common rotation axis. The second cylinder is allowed to protrude from an interior of the base toward a subject, and the first cylinder is allowed to protrude from an interior of the second cylinder toward the subject due to the cam mechanism and rotation of the second cylinder. The cylindrical gear is interposed between the rotation mechanism and the motor, and the shaft gear is interposed between the feed screw and the motor.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

An embodiment of a lens barrel will be explained below with reference to the drawings. The lens barrel of the present embodiment is a lens barrel for a small-sized camera. First, explained is an outline of a structure of the lens barrel 1 of the present embodiment.

Figure 1:
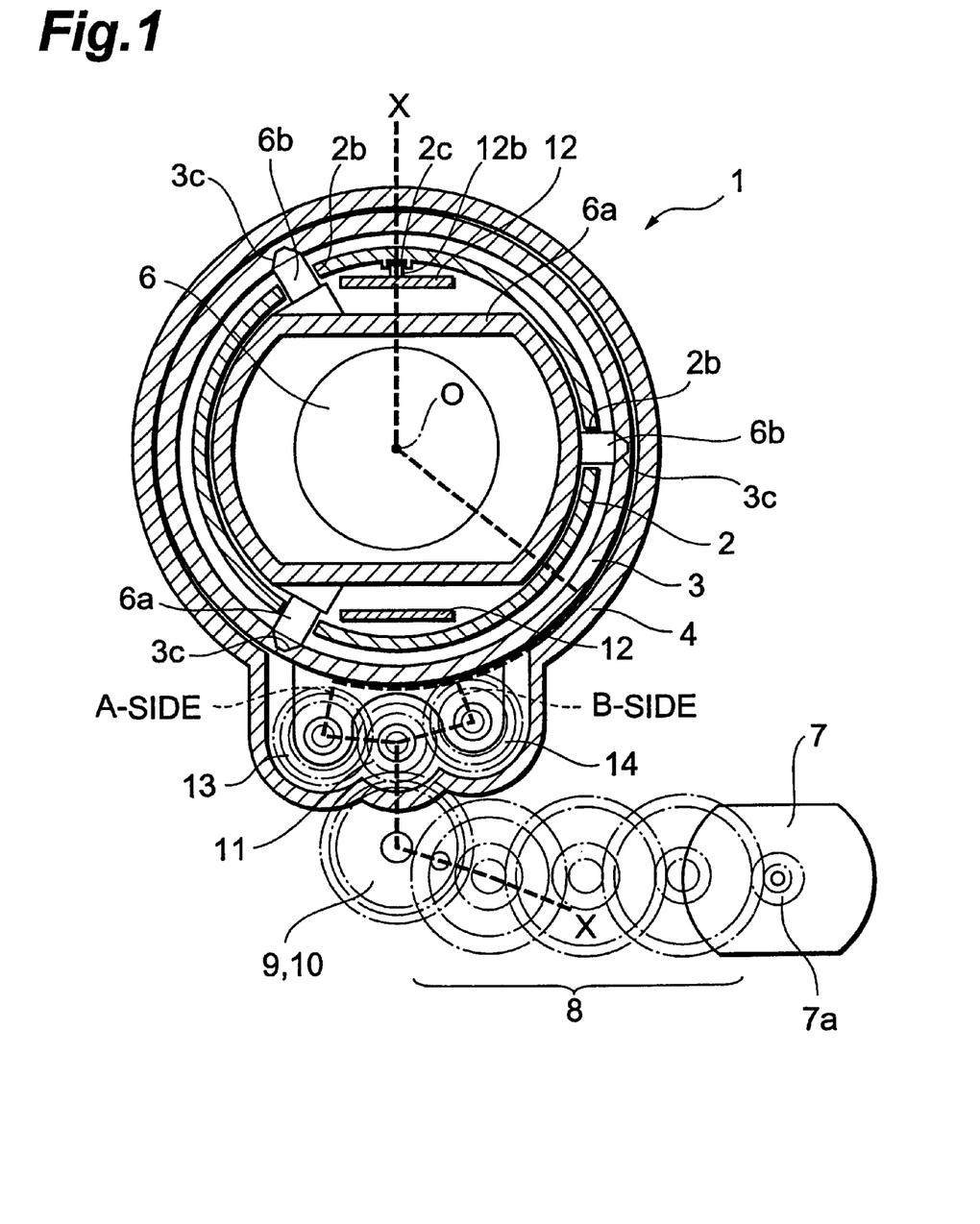
FIG. 1 is a sectional view on a plane vertical to an optical axis and shows cross-section lines X—X(A-SIDE) and X—X(B-SIDE)

FIG. 1 to FIG. 5B show a lens barrel (hereinafter, referred also merely as barrel) 1 of the present embodiment. FIG. 1 shows a sectional view in a plane perpendicular to an optical axis O of the barrel 1. On the other hand, FIGS. 2a and 2B, FIGS. 4A and 4B, and FIGS. 5A and 5B show development views of the section on the line X—X in FIG. 1. FIGS. 3A–3D show a first gear 9 or/and second gear 10 of FIGS. 2A, 4A, and 5A. Incidentally, the first gear 9 and second gear 10 are omitted in FIGS. 2B, 4B, and 5B.

Figure 2A:
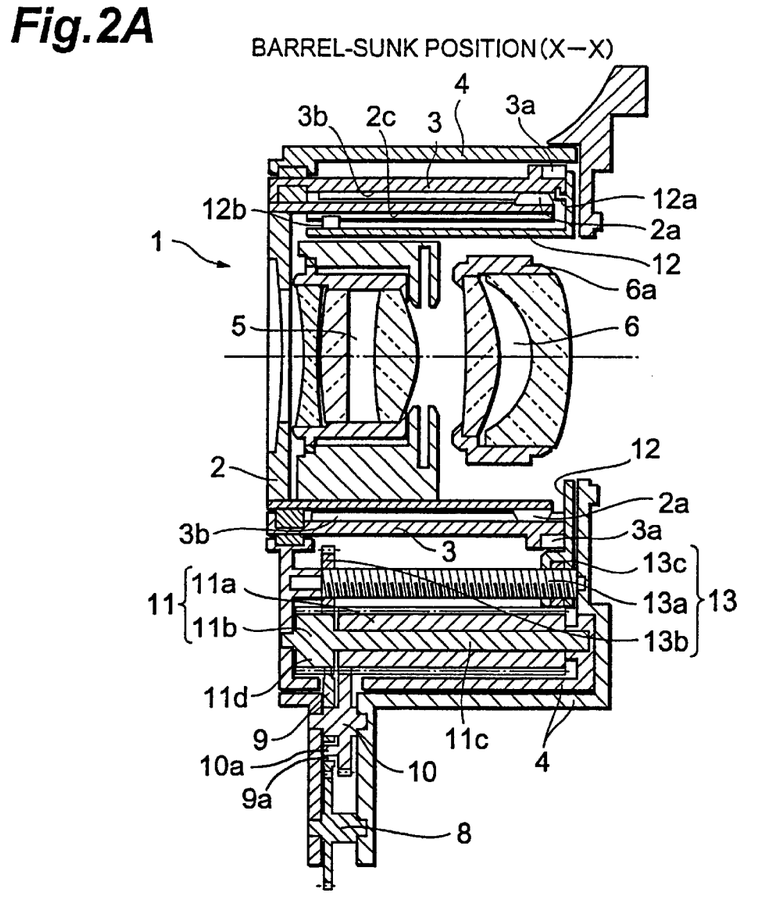
FIG. 2A is a development view of a section on the line X—X(A-SIDE) (barrel-sunk position)
Figure 2B:
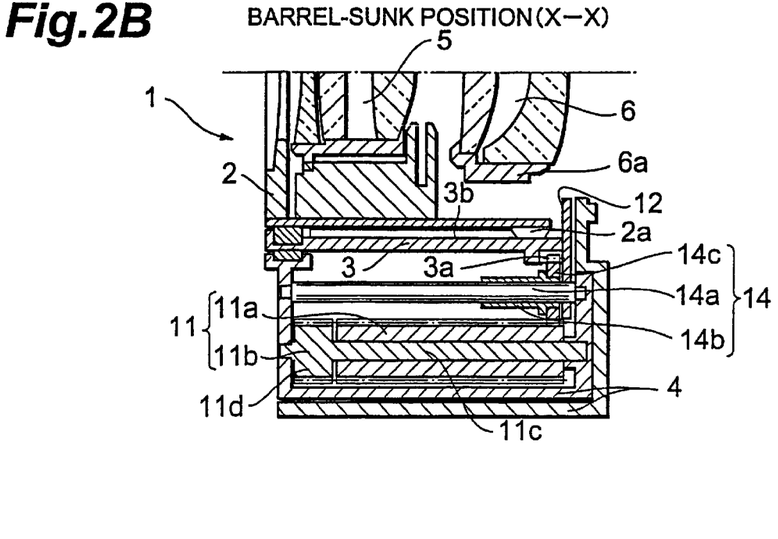
FIG. 2B is a development view of a section on the line X—X(B-SIDE) (barrel-sunk position)
Figure 4A:
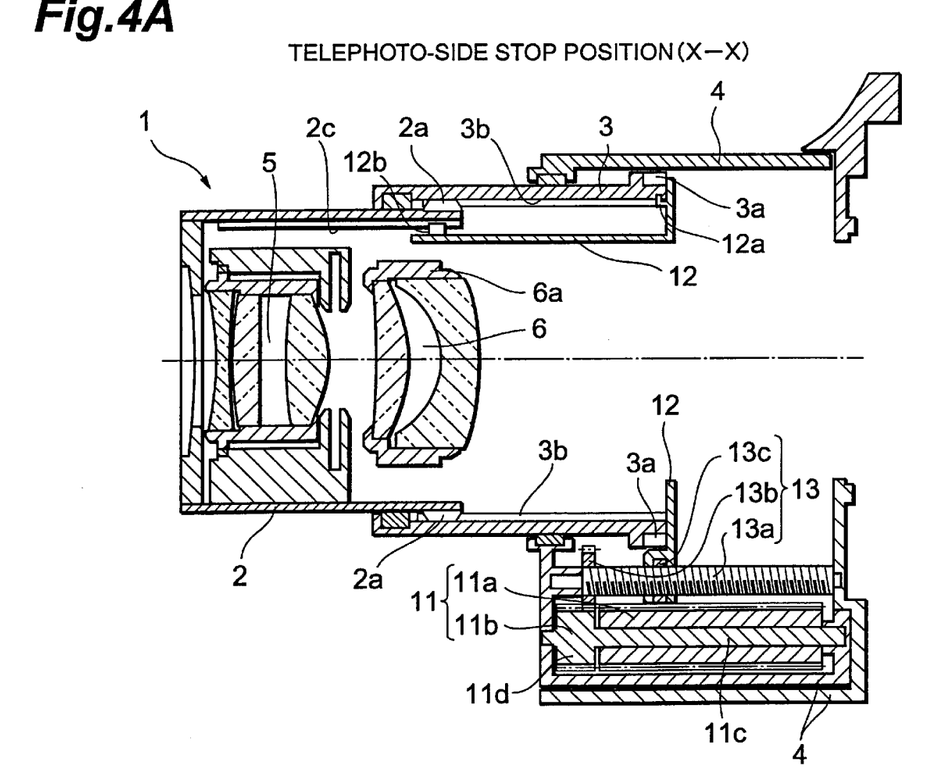
FIG. 4A is a development view of a section on the line X—X(A-SIDE) (telephoto-side stop position)
Figure 4B:
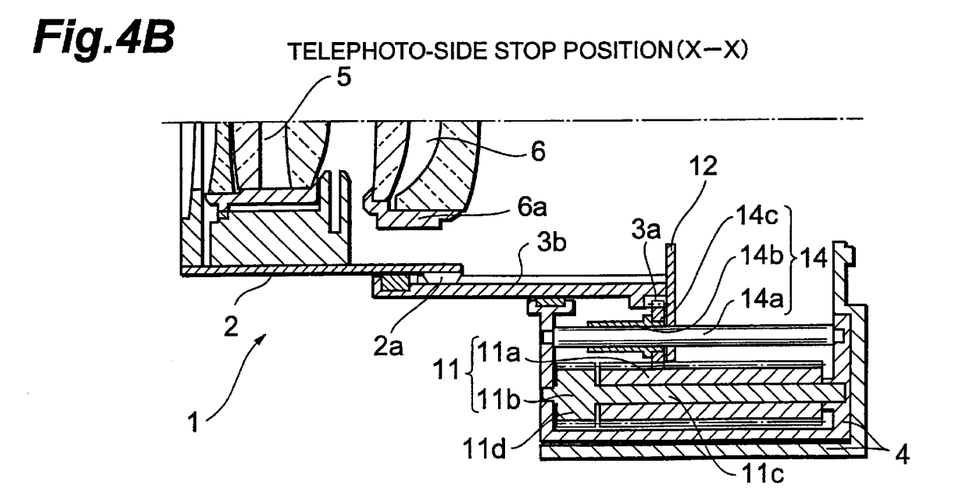
FIG. 4B is a development view of a section on the line X—X(B-SIDE) (telephoto-side stop position)
Figure 5A:
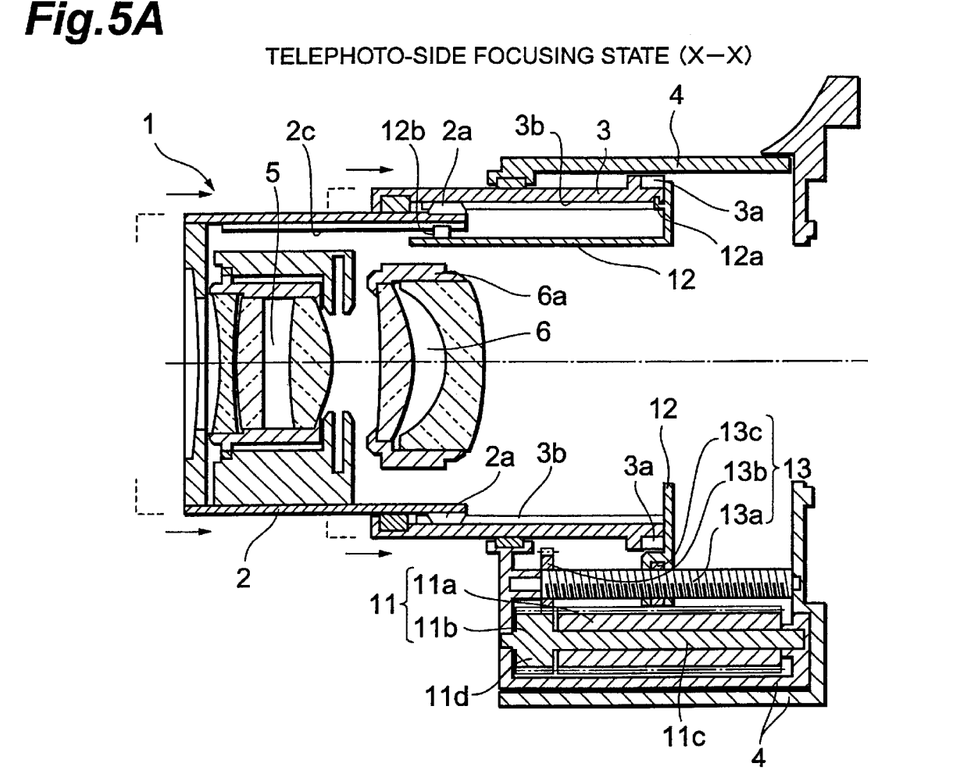
FIG. 5A is a development view of a section on the line X—X(A-SIDE) (telephoto-side focusing state)
Figure 5B:
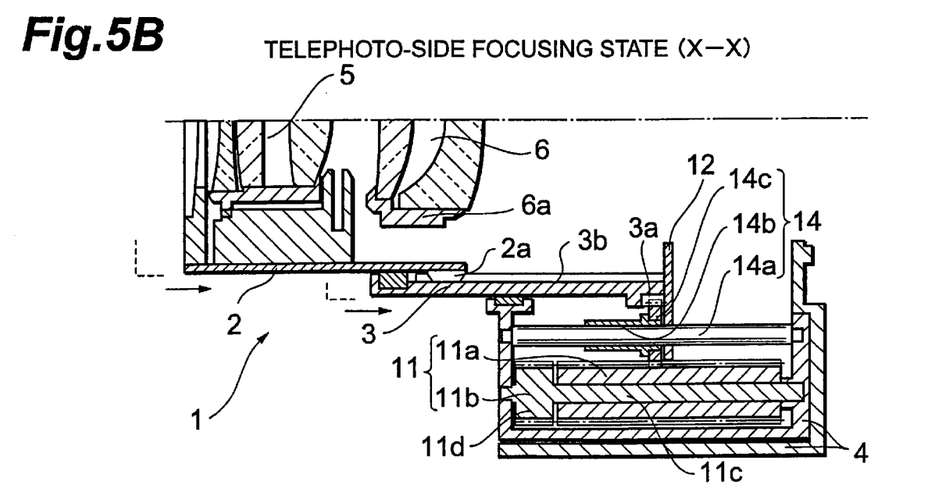
FIG. 5B is a development view of a section on the line X—X(B-SIDE) (telephoto-side focusing state).

The state that the barrel 1 is most shortened in extension/contraction state (hereinafter, this state is also referred to as barrel-sunk position) is shown in FIG. 2A and FIG. 2B. The state that the barrel 1 is most lengthens in extension-contraction state due to zooming (hereinafter, this state is also referred to as a telephoto-side stop state) is shown in FIG. 4A and FIG. 4B. The focusing state from the position shown in FIGS. 4A,4B (hereinafter, this state is also referred to as a telephoto-side focusing state) is shown in FIG. 5A and FIG. 5B. The position of the barrel 1 shown in FIG. 5A and FIG. 5B is one example of focusing. The amount of extension/contraction of the barrel 1 differs depending on a distance to a subject.

The barrel 1 is mainly structured by a first cylinder 2, a second cylinder 3 and a base (fixed cylinder) 4. The first cylinder 2, the second cylinder 3 and the base 4 of the present embodiment have a circular section as shown in FIG. 1. In the barrel-sunk state, as shown in FIGS. 2A,2B, the first cylinder 2 is accommodated in an interior space of the second cylinder 3 and the second cylinder 3 is accommodated in an interior space of the base 4. The base (fixed cylinder) 4 is made integral with the camera main body (not shown).

The first cylinder 2 slides in a direction of the optical axis O relative to both the second cylinder 3 and the base 4. Also, the second cylinder 3 slides in the direction of the optical axis O while rotating about the optical axis as a rotation axis relative to the base 4. That is, the first cylinder 2 is allowed to protrude from an inside of the second cylinder 3 toward a subject side [toward this in FIG. 1, to the left in FIGS. 2A,2B], and the second cylinder 3 is allowed to protrude from an inside of the base 4 toward the subject side.

Furthermore, a first lens group 5 and a second lens group 6 are arranged inside the first cylinder 2. During zooming, the distance between these first lens group 5 and second lens group 6 is adjusted in accordance with a zooming ratio. The first lens group 5 is fixed at the subject side of the first cylinder 2. Also, the second lens group 6, although mounted inside the first cylinder 2, is allowed to move in the direction of the optical axis O within the first cylinder 2. A cam mechanism is made between the second cylinder 3 and a lens holder 6a for the second lens group 6. The movement of the second lens group 6 relative to the first lens group 5 is made using this cam mechanism and the protruding action of the first cylinder 2 from the second cylinder 3. This will be explained later.

In the vicinity of the first cylinder 2, second cylinder 3 and base 4, a motor 7 is arranged as a drive source for the sliding of the first cylinder 2 and rotating/sliding of the second cylinder 3. A gear 7a is attached on an output shaft of the motor 7. This gear 7a transmits a drive force to a drive gear 11 through a reduction gears 8, a first gear 9 and a second gear 10. The first gear 9, second gear 10 and drive gear 11 will be explained in detail later. On the drive gear 11, the transmission path of drive force from the motor 7 is divided to deliver one part to a feed screw mechanism 13 and the other part to a rotation mechanism 14.

Incidentally, the slide operation of the first cylinder 2 is made together with the rotation action of the second cylinder 3.

A feed screw mechanism 13 is a mechanism to slide the second cylinder 3, which is arranged within the base 4. The feed screw mechanism 13 is arranged parallel with the optical axis O. Also, the rotation mechanism 14 is a mechanism to rotate the second cylinder 3, which is arranged in the vicinity of the feed screw mechanism 13 within the base 4. The rotation mechanism 14 is also arranged parallel with the optical axis O. The rotation mechanism 14 has another role to guide for slide action of the second cylinder 3. These feed screw mechanism 13 and rotation mechanism 14 will be also explained in detail later.

Next, the behavior of the first cylinder 2 and second cylinder 3 during zooming will be explained.

Figure 3A:
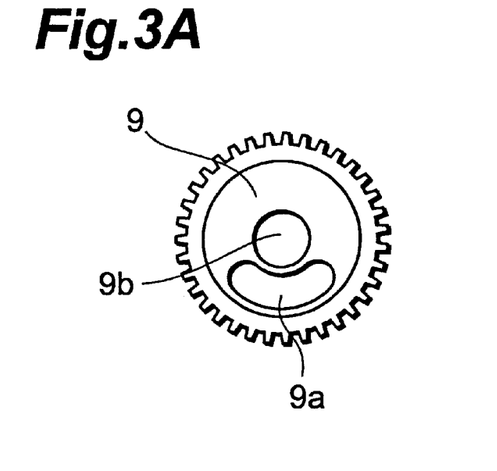
FIG. 3A is a front view of a first gear.
Figure 3B:
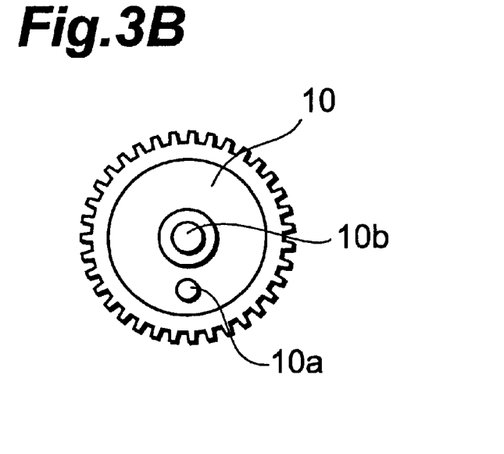
FIG. 3B is a front view of a second gear.

As shown in FIG. 2A, the drive force of the motor 7 is transmitted to a first gear 9 by the reduction gears 8. The first gear 9 rotates about a same rotary shaft as a second gear 10. The first gear 9 and the second gear 10 are shown in FIG. 3. The first gear 9 shown in FIG. 3A, although formed with gear teeth in a disk outer periphery thereof, has an elongate hole 9a circumferentially formed in the disk portion. The elongate hole 9a is not provided in the entire peripheral range of the first gear 9 but in part thereof. Also, the first gear 9 is also formed, at its center, with an insertion hole 9b in which a shaft 10b of the second gear 10 is rotatably inserted.

On the other hand, the second gear 10 shown in FIG. 3B is formed with gear teeth in an outer periphery of its disk similarly to the first gear 9. A protrusion 10a is provided protruding from the disk portion. Also, the second gear 10 is formed, at its center, with a shaft 10b to be rotatably inserted in the insertion hole 9b of the first gear 9. The protrusion 10a protrudes in the elongate hole 9a of the first gear 9, as shown in FIG. 2A. The first gear 9 and the second gear 10 are the same in gear-teeth count and gear radius.

Figure 3C:
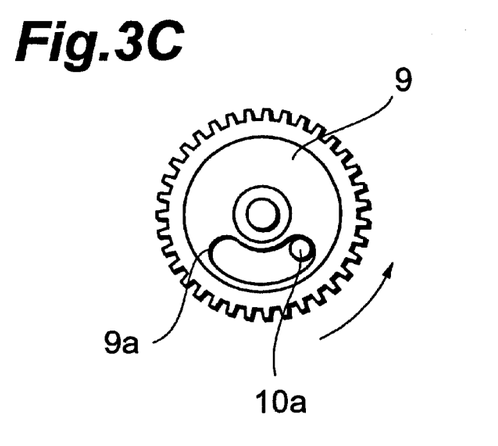
FIG. 3C is a view of a state stacking the first and second gears.
Figure 3D:
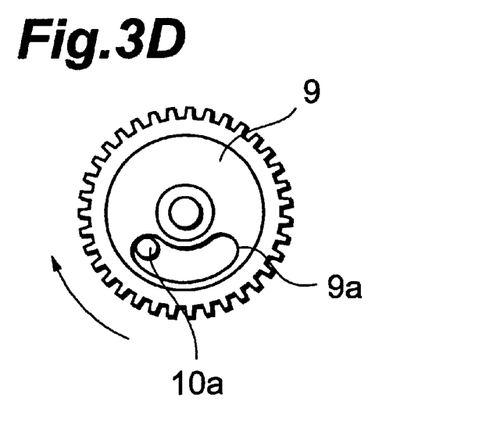
FIG. 3D is also a view of a state stacking the first and second gears.

As described above, the drive force from the motor 7 is transmitted to the first gear 9 through the reduction gears 8. When the first gear 9 is rotated by the drive force, the elongate hole 9a rotates to abut any of opposite ends against the protrusion 10a of the second gear 10. This state is shown in FIG. 3C or FIG. 3D. When the first gear 9 is rotated furthermore in a direction of the arrow in FIG. 3C or FIG. 3D by the reduction gears 8, because the protrusion 10a and the end of the elongate hole 9a are in abutment against, the first gear 9 and the second gear 10 rotate together. When the motor 7 enters into reverse rotation at any time point, only the first gear 9 is rotated before the protrusion 10a comes into abutment against an opposite end of the elongate hole 9a. By the first gear 9 and the second gear 10 structured as above, the drive gear 11 for driving the feed screw mechanism 13 and the rotation mechanism 14 is rotated by the gears 9, 10.

The feed screw mechanism 13 is made mainly at an inside of the base 4, as shown in FIG. 2A. The feed screw mechanism 13 comprises a feed screw 13a arranged parallel with the optical axis O, a gear 13b fixed at one end of a feed screw 13a, and a nut 13c rotatably fitted on the feed screw 13a. The gear 13b rotates about the same rotary axis as the feed screw 13a. The nut 13c is held by a member 12 with restriction of its rotation. The feed screw 13a is formed with a screw groove on its surface. By rotating the feed screw 13a, the nut 13c is moved in left/right directions in FIG. 2A. Due to this, the member 12 and the second cylinder 3 slide relative to the base 4.

The member 12 is attached at a film-surface (image-focusing surface) side of the second cylinder 3. The member 12 does not rotate likewise the second cylinder 3, but follows the sliding of the second cylinder 3 in the optical axis O direction. A flange 12a is formed in an outer periphery of the member 12 in the vicinity of an end thereof. This flange 12a is provided protruding toward an inner surface of the second cylinder 3 and engaged with one-end side of the second cylinder 3. However, the flange 12a is merely in engagement and the second cylinder 3 is rotatable relative to the member 12. The member 12 slides in unison with the second cylinder 3 in the optical axis O direction. Consequently, the member 12 is slid by the feed screw mechanism 13 and simultaneously the second cylinder 3 is also slid.

The rotation mechanism 14 is made within the base 4, as shown in FIG. 2B. The rotation mechanism 14 comprises a guide shaft 14a arranged parallel with the optical axis O, a guide sleeve 14b slidably attached on the guide shaft 14a, and a slide gear 14c fitted in the guide sleeve 14b. The guide sleeve 14b is fixed by the member 12 The slide gear 14c slides together with the guide sleeve 14b but is rotatable relative to the guide sleeve 14b.

The slide gear 14c is in mesh with the gear 3a formed in an end periphery at a film side of the second cylinder 3. The guide sleeve 14b is fixed to the member 12. Also, the slide gear 14c is rotatably held on the guide sleeve 14b by the flange formed on the guide sleeve 14b such that it does not go off the guide sleeve 14b. Due to this, the slide gear 14c, even if the second cylinder 3 slides together with the member 12 in the optical axis O direction, is always in mesh with the gear 3a while following the slide of the guide sleeve 14b.

As shown in FIGS. 2A,2B, the drive gear 11 for transmitting a drive force to the feed screw mechanism 13 and the rotation mechanism 14 is of a double structure comprising a cylindrical gear 11a and a shaft gear 11b. The shaft gear 11b has a shaft 11c inserted in the cylindrical gear 11a. The cylindrical gear 11a and the shaft gear 11b rotate independently of each other about the common rotation axis.

The cylindrical gear 11a is formed with a plurality of linear grooves parallel with the rotation axis on its outer peripheral surface. This linear grooves are in mesh with the slide gear 14c attached to the second cylinder 3 as shown in FIG. 2B. Also, the cylindrical gear 11a is in mesh with the second gear 10 as shown FIG. 2A. The cylindrical gear 11a receives a drive force of the motor 7 from the second gear 10 and transmits it to the slide gear 14c (i.e. rotation mechanism 14).

On the other hand, the shaft gear 11b has a shaft 11c not forming gear teeth on its center. The shaft 11c is inserted in the cylindrical gear 11a. Also, the shaft 11c has a gear lid formed at an end on a subject side. The gear 11d is the same in gear-teeth count and gear radius as the cylindrical gear 11a. The gear 11d is in mesh with the gear 13b of the feed screw mechanism 13, as shown in FIG. 2A. The shaft gear 11b receives, at the gear 11d a drive force of the motor 7 from the first gear 9 and transmits it to the feed screw mechanism 13.

Also, a plurality of parallel helicoid protrusions 2a are formed on an end of a peripheral surface of the first cylinder 2 on a film-surface side, obliquely relative to the optical axis O. A guide groove 2c is formed in the optical-axis direction O on the inner surface of the first cylinder 2 to receive a guide protrusion 12b formed at an outer surface side of the member 12. The second cylinder 3 is formed, over almost entire inner surface, with a plurality of helicoid grooves 3b corresponding to the helicoid protrusions 2a. The helicoid grooves 3b are formed oblique relative to the optical axis O. The helicoid protrusions 2a and the helicoid grooves 3b are in mesh with one another. When the second cylinder 3 rotates, the first cylinder 2 slides relative to the second cylinder 3, but does not rotate due to the engagement between the guide groove 2c and the guide protrusion 12b of the member 12.

Next, explanation is briefly made on the behavior of the first lens group 5 and second lens group 6 during zooming.

The distance between the first lens group 5 and the second lens group 6 is long when in a wide-angle position but short when on a telephoto side. The distance between the first lens group 5 and the second lens group 6 is changed using the cam mechanism and the protruding action of the first cylinder 2 from the second cylinder 3. The structure of the cam mechanism will be explained below. Although the state of the barrel 1 on the wide-angle side position is not shown, the barrel 1 becomes from a wide-angle state to a telephoto state as expanded from the barrel-sunk state.

The cam mechanism comprises, as shown in FIG. 1, pins 6b protruding from a lens holder 6a toward the interior of the second cylinder 3 and cam grooves 3c formed on the inner surface of the second cylinder 3. The lens holder 6a holds the second lens group 6. That is, the second cylinder 3 has the cam grooves 3c together with the helicoid grooves 3b. The pins 6b protrude from slits 2b formed in a film-side end edge of the first cylinder 2 to an outside of the first cylinder 2. Also, the pins 6b are guided by the slits 2b formed in the optical axis O direction. The lens holder 6a is slidable in the optical axis O direction but is not allowed to rotate about the optical axis O as a rotation axis.

When the second cylinder 3 rotates, the pins 6b move following the cam grooves 3c in the optical axis O direction relative to the first cylinder 2. At this time, the first cylinder 2 does not rotate so that the pins 6b positioned in the slits 2b also do not rotate thus moving only in the optical axis O direction in the second cylinder 3.

In this manner, the distance between the first lens group 5 and the second lens group 6 is changed by the extension/contraction action of the first cylinder 2 relative to the second cylinder 3 and the above cam mechanism. This realizes, for each zoom ratio, an optimal distance between the first lens group 5 and the second lens group 6, making possible to optimize the focusing state on a film surface. If doing so, there is no necessity of providing a motor or the like in order to change the distance between the first lens group 5 and the second lens group 6. Thus this can be realized by the extension/contraction action of the first cylinder 2 on the second cylinder 3 and the above cam mechanism. Incidentally, the behavior of the first lens group 5 and second lens group 6 in "focusing" after "zooming" will be explained in detail later.

The zooming operation and focusing operation using the first gear 9, the second gear 10, the drive gear 11, the feed screw mechanism 13 and the rotation mechanism 14 will be explained with reference to FIGS. 2A,B, FIGS. 4A,B and FIG. 5A,B. Each FIG. 2A., FIG. 4A. and FIG. 5A is the sectional development view taken on the line X—X(A-side) in FIG. 1. Also, each FIG. 2B., FIG. 4B. and FIG. 5B is the sectional development view taken on the line X—X(B-side) in FIG. 1. Each FIG. 2B., FIG. 4B. and FIG. 5B shows only a lower portion because the upper portion is same as each FIG. 2A., FIG. 4A. and FIG. 5A. That is, each FIG. 2A., FIG. 4A. and FIG. 5A. shows the mechanism for transmitting a drive force from the motor 7 to the feed screw mechanism 13. Each FIG. 2B., FIG. 4B. and FIG. 5B shows the mechanism for transmitting a drive force from the motor 7 to the rotation mechanism 14. Also, Each FIGS. 2A,B shows a state that the barrel 1 is in a barrel-sunk position. Each FIGS. 4A,B shows a state that the barrel 1 is in a telephoto-side "stop" position due to zooming. The telephoto-side stop position is the initial position in the telephoto position. Each FIGS. 5A,B shows a telephoto-side "focusing" state. The telephoto-side focusing state is the state after focusing from the telephoto-side stop position shown in FIGS. 4A,B.

Although FIG. 2B, FIGS. 4A,B and FIGS. 5A,B do not show the first gear 9 and the second gear 10, the cylindrical gear 11a and the shaft gear 11b of the drive gear 11 are respectively driven by the second gear 10 and the first gear 9 [see FIG. 2A]. When the motor 7 is driven to expand the barrel 1 from the state shown in FIGS. 2A,B, the first gear 9 and the second gear 10 abut against at the elongate hole 9a and the protrusion 10a and rotate together about the common rotation axis, thereby rotating the cylindrical gear 11a and the shaft gear 11b of the drive gear 11. As a result, the shaft gear 11b rotates the feed screw 13a through the gear 13b of the feed screw mechanism 13, and the second cylinder 3 is slid toward the subject relative to the base 4 by the movement of nut 13c.

Simultaneous with this, the cylindrical gear 11a rotates the slide gear 14c of the rotation mechanism 14. When the slide gear 14c is rotated, the second cylinder 3 is rotated because the slide gear 14c and the gear 3a of the second cylinder 3 are in mesh with. At this time, although the second cylinder 3 is slid in the optical axis O direction by the feed screw mechanism 13, the slide gear 14c is always in mesh with the cylindrical gear 11a. The slide gear 14c positively rotates the second cylinder 3 with its sliding. Furthermore, by rotating the second cylinder 3 and the helicoid mechanism, the first cylinder 2 is protruded from the inside of the second cylinder 3 toward the subject side. By the cam mechanism, the second lens group 6 is slid within the first cylinder 2 to adjust the distance between the first lens group 5 and the second lens group 6. The state that the first cylinder 2 and the second cylinder 3 are slid extremely toward the subject is shown in FIGS. 4A,B.

The state shown in FIGS. 4A,B is an initial position of the barrel 1 in a telephoto position. In this state, the zooming has been ended, followed by focusing to adjust the focus of the subject image on the film surface. Focusing is made by moving the first lens group 5 and second lens group 6 together in the optical axis O direction without changing the distance between them. This is made by reverse rotating the motor 7 from the position shown in FIGS. 4A,B. That is, the initial position in each zoom ratio is set in a state that focusing is on the subject side of the film-surface position. Focusing is performed from this position.

When the motor 7 is reverse rotated for focusing, the shaft gear 11b only is rotated without rotation of the cylindrical gear 11a before the second gear 10 at its protrusion 10a comes into contact with the other end of the elongate hole 9a of the first gear 9. Due to this, before the second gear 10 at its protrusion 1a contacts the other end of the elongate hole 9a of the first gear 9, as shown in FIGS. 5A,B the screw feed mechanism only 13 is driven to slide the first cylinder 2 and second cylinder 3 toward the film-surface side without changing the position between them to perform focusing. Because the cylindrical gear 11a is not rotated, the rotation mechanism 14 is out of function resulting in no rotation of the second cylinder 3 and no slide of the first cylinder 2 due to rotation of the second cylinder 3. Thus, the barrel 1 is expanded or contracted to perform zooming and focusing.

The lens barrel of the present invention is not limited to the above embodiment. For example, with the lens barrel of the above embodiment, the first cylinder 2 is slid relative to the second cylinder 3 by the helicoid mechanism formed on the outer peripheral surface of the first cylinder 2 and the inner surface of the second cylinder 3. However, a cam mechanism can be used as a mechanism to slide the first cylinder 2 relative to the second cylinder 3 instead of the helicoid mechanism.

This embodiment is also shown by FIGS. 2A,B to FIGS. 5A,B. In this embodiment, cam pins 2a are protruded from the outer peripheral surface of the first cylinder 2 toward the outward, and cam grooves 3b are formed in an inner surface of the second cylinder 3 in order for engagement with a tip of the cam pins 2a. Thus, due to the rotation of the second cylinder 3, the first cylinder 2 can be slid relative to the second cylinder 3 by the cam mechanism formed by the cam pins 2a and the cam grooves 3b.

Also, with the above embodiment, although the optical system was made by the two lens groups, i.e., the first lens group 5 and the second lens group 6, the optical system may be made by three or more of lens groups. Also, in the above embodiment, any of the lens groups, i.e. the first lens group 5 and the second lens group 6 was made by a plurality of lenses, there can be a case that one lens group be made by only one lens. Furthermore, where a plurality of lenses are provided, a structure can be contemplated that all of them are not arranged at the interior of the first cylinder 2.

Also, in the above embodiment, the first gear 9 for driving the feed screw mechanism 13 had the elongate hole 9a and the second gear 10 for driving the rotation mechanism 14 had the protrusion 10a. However, conversely, the gear for rotating the rotation mechanism 14 may have a pin, and the gear for driving the feed screw mechanism 13 has an elongate hole. Furthermore, in the present embodiment, although the first gear 9 and second gear 10 rotate the drive gear 11 directly, other gears may be interposed between them. However, the structure for directly driving the drive gear 11 by the first gear 9 and second gear 10 is superior in space efficiency and hence preferred. Similarly, the structure for directly driving the feed screw mechanism 13 and the rotation mechanism 14 by the drive gear 11 is superior in space efficiency and hence preferred.

In the present invention, the drive gear comprises a cylindrical gear and a shaft gear having a shaft inserted in the cylindrical gear. And the cylindrical gear and the shaft gear rotate about a common rotation axis. And more, the shaft gear is interposed between the feed screw mechanism and the motor. The cylindrical gear is interposed between the rotation mechanism and the motor. Accordingly, because the mechanism for transmitting a motor drive force can be made compact, space efficiency is excellent. Also, because the first cylinder and the second cylinder can be slid by the single motor through the drive gear, space efficiency is excellent also from this viewpoint.

Furthermore, one motor is satisfactorily required resulting in excellence in cost.

Furthermore, because the second cylinder is slid by the feed screw mechanism without being slid by the helicoid mechanism (the "first cylinder" is slid by the helicoid mechanism), parts are easy to fabricate. The helicoid mechanism requires to form a complicated protrusion(s) and groove(s) in an outer and inner peripheral surfaces of a cylindrical member, and these parts are difficult to manufacture. In particular, these parts are generally formed by resin-molded parts. The formation of such protrusion and groove requires making a complicated form of a forming mold and providing a complicate slide mechanism in the forming mold. According to the invention, because the helicoid mechanisms are minimum (only for the slide of the first cylinder but not for the slide of the second cylinder), manufacture efficiency can be improved and manufacture cost be reduced.

A pair of first and second gears are preferably included which rotates about a common axis. The first gear is interposed between the shaft gear and the motor. And the second gear is interposed between the cylindrical gear and the motor. Any one of the first gear and the second gear has an elongate hole formed in a circumferential direction, and the other has a protrusion protruding into the elongate hole. Accordingly, zooming and focusing can be made by one motor, it increases density and integration and provides excellent space efficiency. Also, this makes only one motor as a drive source not only for zooming but also for focusing.

The first lens group and the second lens group are provided in the first cylinder. The second lens groove is moved relative to the first lens group by the cam mechanism and protruding movement of the first cylinder from the second cylinder. Accordingly, there is no need to provide a drive source, such as a separate motor for adjusting the distance between the both lens groups suited for a zoom ratio. This provides excellence in terms of cost, reduces the number of parts, and achieving high-integration (excellent space efficiency).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A lens barrel comprising:
   a first cylinder sliding in an optical axis direction of an optical system;
   a second cylinder sliding in the optical axis direction while rotating about the optical axis as a rotation axis;
   a base for accommodating said first cylinder and said second cylinder therein;
   a single motor as a drive source for sliding both of said first cylinder and said second cylinder;
   a feed screw located in said base for sliding said second cylinder in response to a drive force of said motor;
   a rotation mechanism located in said base for rotating said second cylinder in response to the drive force of said motor;
   a helicoid mechanism in an outer peripheral surface of said first cylinder and an inner surface of said second cylinder; and
   a drive gear transmitting the drive force of said motor to said feed screw and said rotation mechanism, wherein said second cylinder may protrude from an interior of said base toward a subject,
   said first cylinder may protrude from an interior of said second cylinder toward the subject due to said helicoid mechanism and rotation of said second cylinder,
   said drive gear comprises a cylindrical gear and a shaft gear having a shaft inserted in said cylindrical gear, said cylindrical gear and said shaft gear rotating about a common rotation axis, and
   said cylindrical gear is interposed between said rotation mechanism and said motor, said shaft gear being interposed between said feed screw and said motor.

2. The lens barrel according to claim 1, comprising first and second gears rotating about a common rotation axis, said first gear being interposed between said shaft gear and said motor, said second gear being interposed between said cylindrical gear and said motor, one of said first gear and said second gear having an elongate hole in a circumferential direction, the other of said first gear and second gear having a protrusion protruding into the elongate hole.

3. The lens barrel according to claim 2, having:
   a first lens group and a second lens group movable relative to said first lens group within said first cylinder; and
   a cam mechanism comprising pins protruding from a lens holder holding said second lens group, and cam grooves in an inner surface of said second cylinder, wherein said second lens group is moved relative to said first lens group by said cam mechanism for protruding movement of said first cylinder from said second cylinder.

4. A lens barrel comprising:
   a first cylinder sliding in an optical axis direction of an optical system;
   a second cylinder sliding in the optical axis direction while rotating about the optical axis as a rotation axis;
   a base for accommodating said first cylinder and said second cylinder therein;
   a single motor as a drive source for sliding both of said first cylinder and said second cylinder;
   a feed screw located in said base for sliding said second cylinder in response to a drive force of said motor;
   a rotation mechanism located in said base for rotating said second cylinder in response to the drive force of said motor;
   a cam mechanism comprising pins protruding from said first cylinder and cam grooves in an inner surface of said second cylinder; and
   a drive gear transmitting the drive force of said motor to said feed screw and said rotation mechanism, wherein said second cylinder may protrude from an interior of said base toward a subject,
   said first cylinder may protrude from an interior of said second cylinder toward the subject due to said cam mechanism and rotation of said second cylinder,
   said drive gear comprises a cylindrical gear and a shaft gear having a shaft inserted in said cylindrical gear, said cylindrical gear and said shaft gear rotating about a common rotation axis, and
   said cylindrical gear is interposed between said rotation mechanism and said motor, said shaft gear being interposed between said feed screw and said motor.

* * * * *